US009223968B2

(12) United States Patent
Hu

(10) Patent No.: US 9,223,968 B2
(45) Date of Patent: Dec. 29, 2015

(54) DETERMINING WHETHER VIRTUAL NETWORK USER IS MALICIOUS USER BASED ON DEGREE OF ASSOCIATION

(71) Applicant: Alibaba Group Holding Limited, George Town, KY (US)

(72) Inventor: Sihai Hu, Hangzhou (CN)

(73) Assignee: Alibaba Group Holding Limited (KY)

( * ) Notice: Subject to any disclaimer, the term of this patent is extended or adjusted under 35 U.S.C. 154(b) by 0 days.

(21) Appl. No.: 14/491,458

(22) Filed: Sep. 19, 2014

(65) Prior Publication Data

US 2015/0161387 A1  Jun. 11, 2015

Related U.S. Application Data

(63) Continuation of application No. 13/852,201, filed on Mar. 28, 2013, now Pat. No. 8,875,291.

(30) Foreign Application Priority Data

Apr. 1, 2012  (CN) .......................... 2012 1 0096275

(51) Int. Cl.
 *G06F 21/55* (2013.01)
 *G06Q 50/00* (2012.01)
 *H04L 29/06* (2006.01)

(52) U.S. Cl.
 CPC .............. *G06F 21/552* (2013.01); *G06Q 50/01* (2013.01); *H04L 63/0876* (2013.01); *H04L 63/126* (2013.01)

(58) Field of Classification Search
 CPC . G06F 21/552; H04L 63/0876; H04L 63/126; G06Q 50/01

USPC .................................... 726/23, 30; 713/155
See application file for complete search history.

(56) References Cited

U.S. PATENT DOCUMENTS

| | | | | |
|---|---|---|---|---|
| 6,026,166 | A * | 2/2000 | LeBourgeois | 713/156 |
| 7,290,145 | B2 * | 10/2007 | Falkenthros | 713/182 |
| 7,412,422 | B2 * | 8/2008 | Shiloh | 705/74 |
| 7,467,211 | B1 * | 12/2008 | Herman et al. | 709/229 |
| 7,685,034 | B1 * | 3/2010 | Mori et al. | 705/31 |
| 8,112,405 | B2 * | 2/2012 | Shiloh | 707/705 |
| 8,230,088 | B2 * | 7/2012 | Herman et al. | 709/229 |
| 8,645,348 | B2 * | 2/2014 | Shiloh | 707/705 |
| 2001/0037316 | A1 * | 11/2001 | Shiloh | 705/74 |
| 2003/0105715 | A1 * | 6/2003 | Friedman et al. | 705/43 |
| 2007/0040810 | A1 * | 2/2007 | Dowe et al. | 345/173 |
| 2008/0175266 | A1 | 7/2008 | Alperovitch et al. | |
| 2009/0024636 | A1 * | 1/2009 | Shiloh | 707/10 |
| 2009/0070478 | A1 * | 3/2009 | Herman et al. | 709/231 |
| 2012/0101911 | A1 * | 4/2012 | Shiloh | 705/26.1 |
| 2012/0101970 | A1 * | 4/2012 | Zernik et al. | 706/45 |
| 2012/0310618 | A1 * | 12/2012 | B'Far et al. | 703/13 |
| 2012/0310870 | A1 * | 12/2012 | Caves et al. | 706/14 |
| 2013/0276115 | A1 * | 10/2013 | Hu | 726/23 |

* cited by examiner

*Primary Examiner* — Haresh N Patel
(74) *Attorney, Agent, or Firm* — Van Pelt, Yi & James LLP

(57) ABSTRACT

Embodiments of the present application relate to a method of controlling user risk, a system for controlling user risk, and a computer program product for controlling user risk. A method is provided. The method includes retrieving association data of a first user and association data of a second user, the association data including multidimensional data, and data relating to each dimension identifying a user and serving as an association dimension, based on the association data, computing an association value between the first user and the second user for an association dimension, gathering the association value to obtain a degree of real association, and determining that the other user is malicious.

12 Claims, 15 Drawing Sheets

DETERMINING WHETHER VIRTUAL NETWORK USER IS MALICIOUS USER BASED ON DEGREE OF ASSOCIATION

CROSS REFERENCE TO OTHER APPLICATIONS

This application is a continuation of U.S. patent application Ser. No. 13/852,201, now U.S. Pat. No. 8,875,291, entitled NETWORK VIRTUAL USER RISK CONTROL METHOD AND SYSTEM filed Mar. 28, 2013 which is incorporated herein by reference for all purposes, which claims priority to People's Republic of China Patent Application No. 201210096275.0 entitled A NETWORK VIRTUAL USER RISK CONTROL METHOD AND SYSTEM, filed Apr. 1, 2012 which is incorporated herein by reference for all purposes.

FIELD OF THE INVENTION

The present application relates to a network virtual user risk control method and system.

BACKGROUND OF THE INVENTION

As the Internet matures, more people are interacting via networks, and the networks are becoming a platform for the exchange of information for many users. In networks, every user is a virtual user, and the actions of virtual users in the network reflect the relationships between users in the real world.

For example, in a social networking service (SNS), FIG. 1 is a schematic diagram illustrating SNS friends in a social network. If virtual user A and virtual user B have a friend, user C, in common, then users A and B are very likely or have a high likelihood of also being friends in the real world. In other words, user A is associated with user B.

In actual application, real associations among virtual users can be used for controlling risk of an online action of a user. For example, in an online transaction system, if fraud is detected on a part of a certain user during a transaction process, the user has already been added to a blacklist of malicious users, and other virtual users with whom this malicious user has real associations can be detected, the possibility of an act of fraud by one of the other virtual users is also very high. Thus, the other associated virtual users can be set as malicious users in advance, thereby preventing the occurrence of a transaction fraud.

In the above risk control process, the online transaction system generally uses device data or device fingerprints to analyze the real associations of virtual users. By collecting the device data (i.e., device fingerprints), such as a hard drive, a motherboard and other data that is capable of uniquely identifying a device, a determination can be made whether virtual users use the same physical device. For example, if two virtual users are determined to use one physical device, then an association could exist between these two virtual users.

The present system is limited as follows: associated users can only be determined with different virtual users use the same physical device; if the virtual users use different physical devices, even if they are associated users, the method described above is unable to detect an association between users. Therefore, the above method of analysis is too limited, is unable to detect the real associations of network virtual users accurately, and is therefore unable to identify malicious users accurately. Accordingly, the above method of analysis does not significantly minimize acts of network fraud.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

During analysis of real user associations, a network virtual user risk control method can compute an association value for an association dimension.

The association dimension can be related to information capable of identifying a user, such as a device fingerprint, an internet protocol (IP) address, a cookie, a mobile phone number, a telephone number, a fax number, an email address, an address, a user name, etc. All of the information can serve as an association dimension for the analysis of a real association between users.

Moreover, the association value can include a quantity factor, a time factor and a cascade factor.

Figure 1:
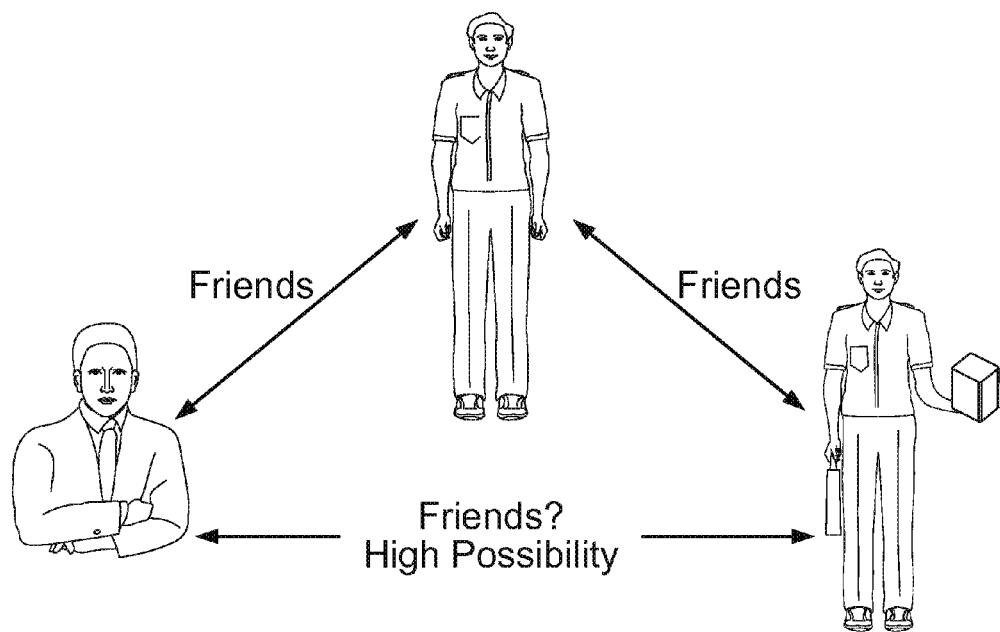
FIG. 1 is a schematic diagram illustrating SNS friends in a social network.
Figure 2:
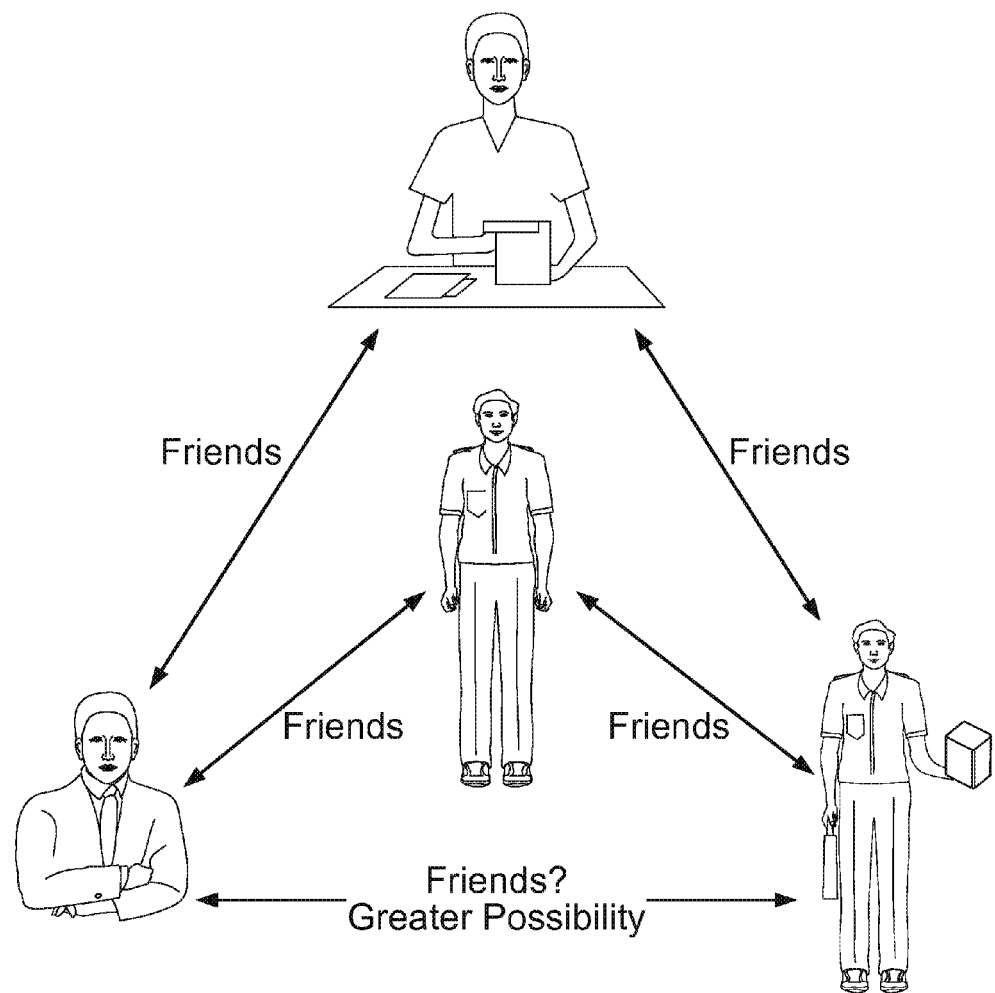
FIG. 2 is a schematic diagram illustrating an embodiment of a quantity factor.

FIG. 2 is a schematic diagram illustrating an embodiment of a quantity factor.

The quantity factor relates to: if virtual user A and virtual user B both have a group of friends C, D, E . . . , in common, then the likelihood that A and B are friends is extremely high.

Figure 3A:
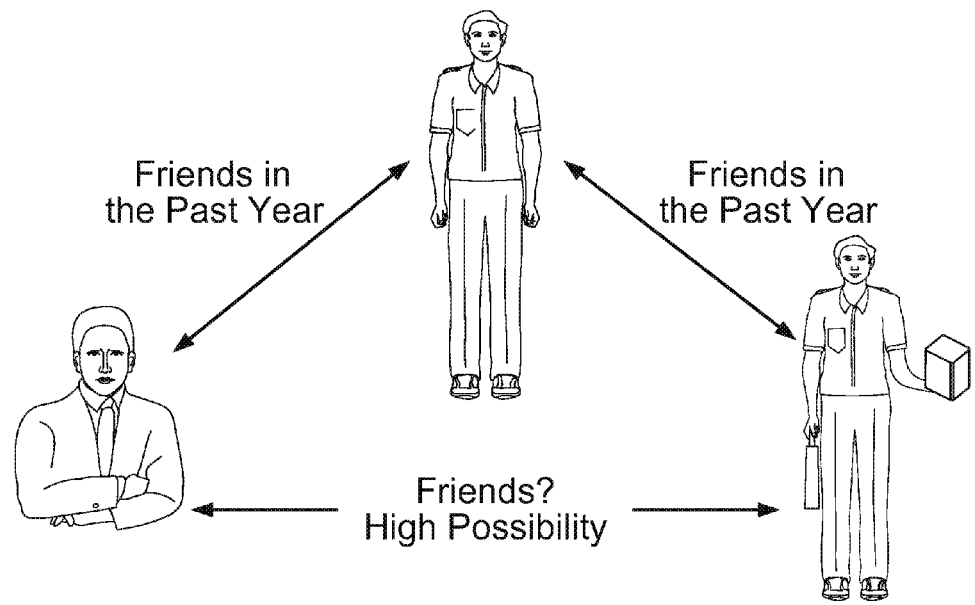
FIGS. 3A through 3C are schematic diagrams illustrating an embodiment of a time factor.
Figure 3B:
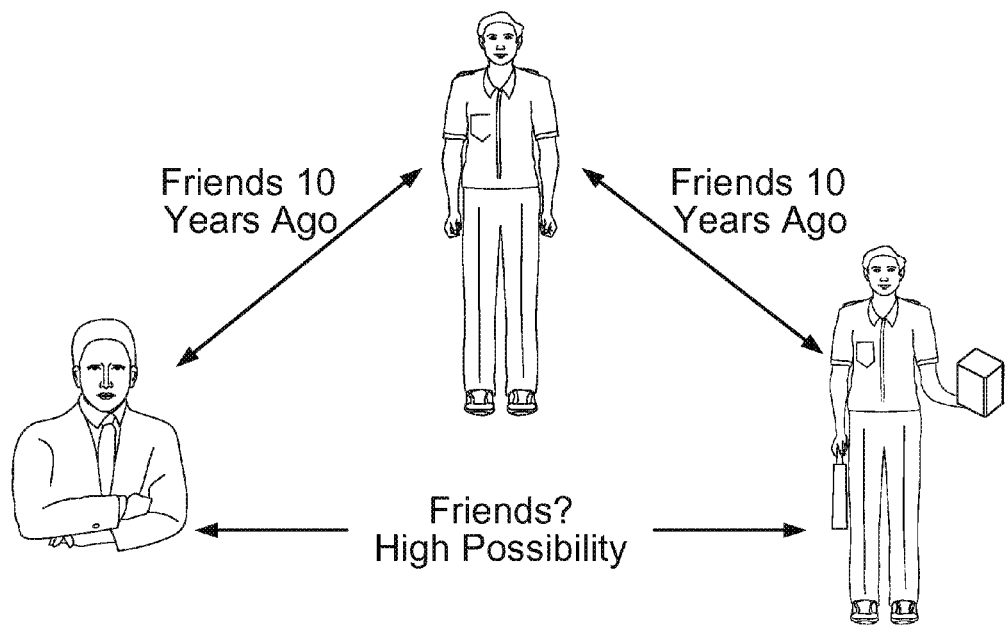
Figure 3C:
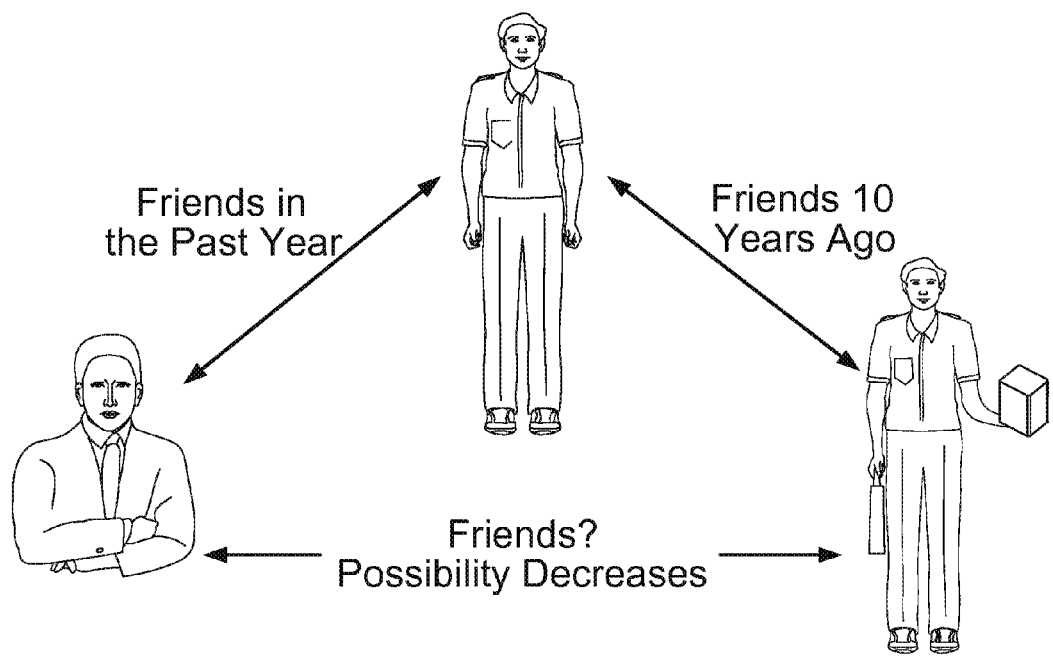

FIGS. 3A through 3C are schematic diagrams illustrating an embodiment of a time factor.

The time factor relates to: if virtual user A and virtual user B both have a friend C in common, and both virtual users A and B became friends with C within the past year, then the likelihood that A and B are friends is extremely high, as shown in FIG. 3A. Similarly, if virtual user A and virtual user C were friends ten years ago, and virtual user B and virtual user C were also friends ten years ago, then the likelihood that virtual users A and B are friends is also extremely high, as shown in FIG. 3B. Conversely, if virtual user A and virtual user C were friends ten years ago, but virtual user B and virtual user C only became friends within the past year, then the likelihood that virtual users A and B are friends will be lower than in the previous two scenarios, as shown in FIG. 3C.

Figure 4:
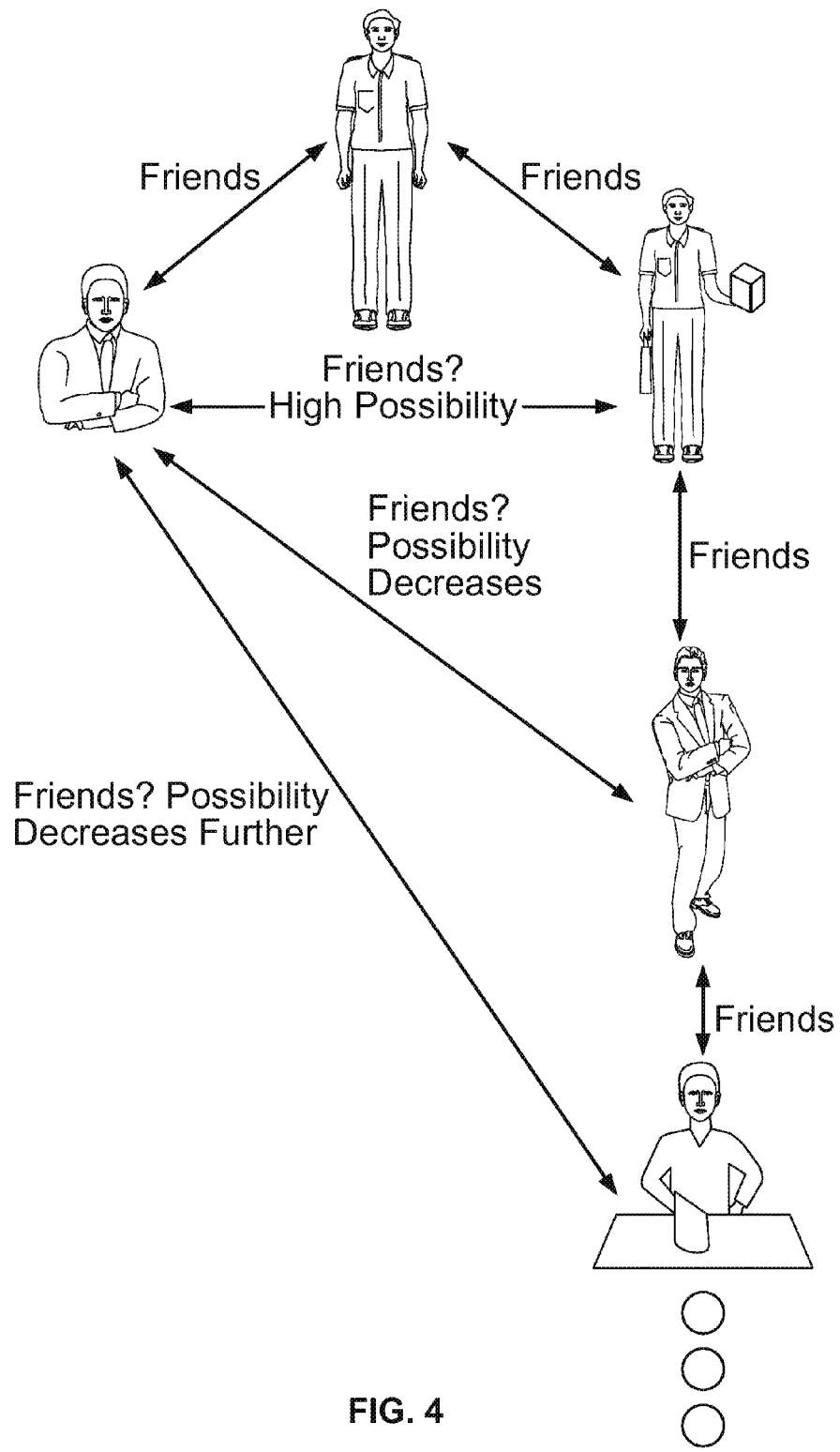
FIG. 4 is a schematic diagram illustrating an embodiment of a cascade factor.

FIG. 4 is a schematic diagram illustrating an embodiment of a cascade factor.

The cascade factor relates to: the friend of a friend of a friend . . . may also be a friend of yours. The greater the number of cascade derivatives, the lower the possibility that the person is a friend of yours. A friend can be a friend in a social networking context such as facebook.com or linkedin.com. For example, in the event that virtual user A and virtual user B are friends, and virtual user B and virtual user C are friends, then the likelihood that virtual users A and C are friends is very high. In the event that virtual user C and virtual user D are friends, then the likelihood that virtual users A and D are friends is lower in comparison to the likelihood that virtual users A and C are friends. In addition, in the event that virtual user D and virtual user E are friends, then the likelihood that virtual users A and E are friends is lower in comparison to the likelihood that virtual users A and D are friends. Virtual users A and B can be referred to as level one associations, virtual users A and C can be referred to as level two associations, virtual users A and D can be referred to as level three associations, and virtual users A and E can be referred to as level four associations.

Figure 5:
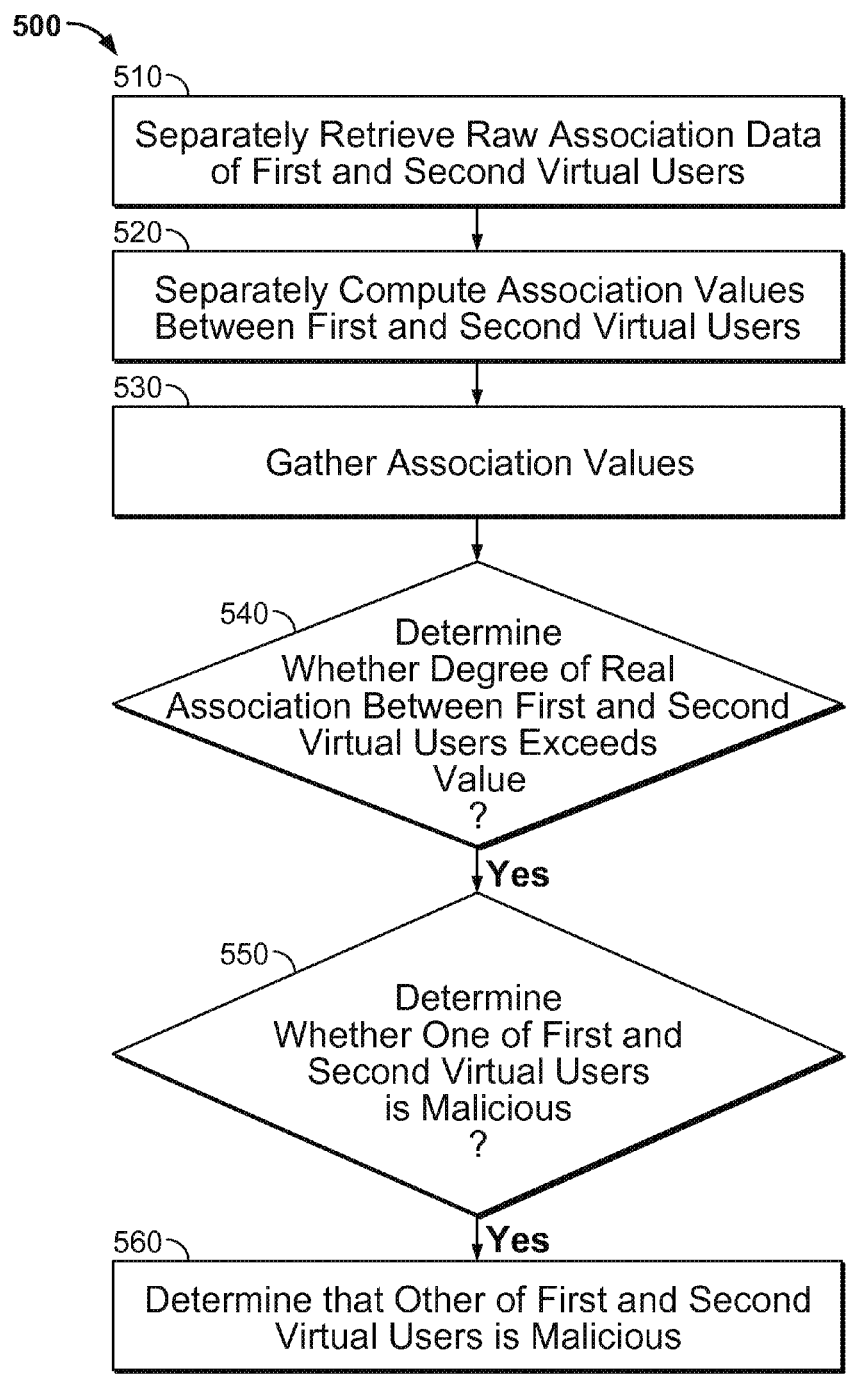
FIG. 5 is a flow chart illustrating an embodiment of a network virtual user risk control method.

FIG. 5 is a flow chart illustrating an embodiment of a network virtual user risk control method. An example of an analysis of real associations between two virtual users is used. A system 900 of FIG. 9 can implement the method 500. The method 500 comprises:

In 510, a server is configured to separately retrieve raw association data of a first virtual user and raw association data of a second virtual user. The raw association data includes multidimensional data. Data related to each dimension serves as an association dimension and is capable of identifying a user.

The multidimensional data can include information such as an IP address, a cookie, a device fingerprint, a mobile phone number, a telephone number, a fax number, an email address, an address, a user names, or any combination thereof. The data related to each dimension is capable of identifying the identity of the user. The data related to each dimension can be used to analyze the degree of association between virtual users. Additionally, other information capable of identifying the identity of the virtual user can also be used as association data. An example of the other information can include a media access control (MAC) address.

In 520, based on the raw association data of the first and second virtual users, the server is configured to separately compute at least one association value between the first virtual user and the second virtual user for an association dimension. In some embodiments, the server can be configured to compute at least one association value between the first virtual user and the second virtual user for each association dimension.

For example, the raw association data of the first virtual user and the second virtual user both include an Internet Protocol (IP) address and a cookie. The IP address can be used to compute a first association value between the first and second virtual users. The cookie can be used to compute a second association value between the first and second virtual users.

An analytical factor under the same association dimension can be expanded to include a quantity factor, a time factor and a cascade factor. Thus, for each association dimension, the at least one association value between the first virtual user and the second virtual user can be computed based on the quantity factor, the time factor, and the cascade factor.

Methods for computing association values based on analytical factors are discussed below.

In 530, the server is configured to gather the at least one association values for each association dimension to obtain a degree of real association between the first virtual user and the second virtual user. The degree of real association can refer to whether the first virtual user and the second virtual user are the same person or whether they are related to the same group of people.

Many methods of achieving the gathering exist, and a method of achieving the gathering can be determined based on actual application conditions.

For example, association values for each of the association dimensions can be summed. The results of the summation can express the degree of real association between the first virtual user and the second virtual user. The summation can be a simple summation function, a sum of squares function or a weighted sum function.

For example:

$$\text{Sum} = x1 + x2 + x3;$$

$$\text{Sum of squares} = x1^2 + x2^2 + x3^2;$$

$$\text{Weighted sum} = a*x1 + b*x2 + c*x3;$$

Note: $x1^2 = x1*x1$, a, b, and c are all weighting coefficients, and x1, x2, and x3 can refer to association values for association dimensions. For example, x1 can be related to an Internet Protocol (IP) address, x2 can be related to a value of a cookie, etc. The weighting coefficients can be determined based on a scenario. For example, x1 can correspond to an association value of an IP address, x2 can correspond to an association value of a cookie, and x3 can correspond to an association value of a device fingerprint.

For example, the IP address can identify the user accurately 30% of the time, the cookie can identify the user accurately 60% of the time, and the device fingerprint can identify the user accurately 90% of the time. Accordingly, the weighting coefficients can be as follows: a=3, b=6, c=9. In another example, the weighting coefficients can be as follows: a=1, b=2, c=3.

Accordingly, the weighted sum can be $a*x1+b*x2+c*x3$, which corresponds to $3*x1+6*x2+9*x3$.

In another example, users A and B have used the same IP address 201.1.232.34, and have the same cookies 121.0.29.196.69552022087219.5, and 121.0.29.199.91242113215430.0. Accordingly, x1 corresponds to 1, x2 corresponds to 2, and x3 corresponds to 10. Thus, the weighted sum can be $3*x1+6*x2+9*x3=3*1+6*2+9*0=15$.

In 540, the server is configured to determine whether the degree of real association between the first virtual user and second virtual user exceeds a predetermined threshold value.

The threshold value can also be determined based on the scenario. For example, the threshold value can correspond to 10. The weighted sum of 15 is greater than the threshold value corresponding to 10. In other words, the degree of real association between users A and B exceeds the predetermined threshold value.

If weighting coefficients are not set to a=3, b=6, and c=9, but instead set to a=1, b=2, and c=3. The weighted sum corresponds to $a*x1+b*x2+c*x3=1*x1+2*x2+3*x3=1*1+2*2+3*0=5$. In this example, the degree of real association between users A and B fails to exceed the predetermined threshold value.

In some embodiments, the weighting coefficients can be determined first, and the threshold value can be adjusted based on the scenario.

Back to the example where a=3, b=6, c=9, users A and B have the same IP address 201.1.232.34, and the same cookies 121.0.29.196.69552022087219.5 and 121.0.29.199.91242113215430.0. The weighted sum for users A and B corresponds to $3*1+6*2+9*0=15$.

With respect to users A and C, users A and C have used a same device fingerprint C4790b2737cae5ab73f2aaale33834b98. The weighted sum for users A and C corresponds to $3*0+6*0+9*1=9$. In the event that the threshold value corresponds to 10, the degree of real association between users A and B exceeds the threshold value, and the degree of real association between users A and C does not exceed the threshold value.

If the scenario desires the degree of real association between users A and C to exceed the threshold value, the threshold value can be set to correspond to 8.

In 550, in the event that the degree of real association between the first virtual user and second virtual user exceeds the predetermined threshold value, the server is configured to determine whether one of the first and second virtual users is a malicious user.

In 560, in the event that one of the first and second virtual users is a malicious user, the server is configured to determine that the other of the first and second virtual users is a malicious user.

In network risk control, after performing operations 510 through 530, the degree of real association between two virtual users can be obtained. Based on the obtained degree of real association between the two virtual users, in the event that the degree of real association between the two virtual users exceeds the predetermined threshold value, the degree exceeding the predetermined threshold value indicates that the degree of association between the two users in the real world is very high. Thus, in the event that one of the two users has already been determined to be a malicious user, the likelihood is also very high that the other of the two users is a malicious user. Therefore, the associated user having a degree of association with the one user that exceeds the predetermined threshold value is also determined to be a malicious user.

Figure 6A:
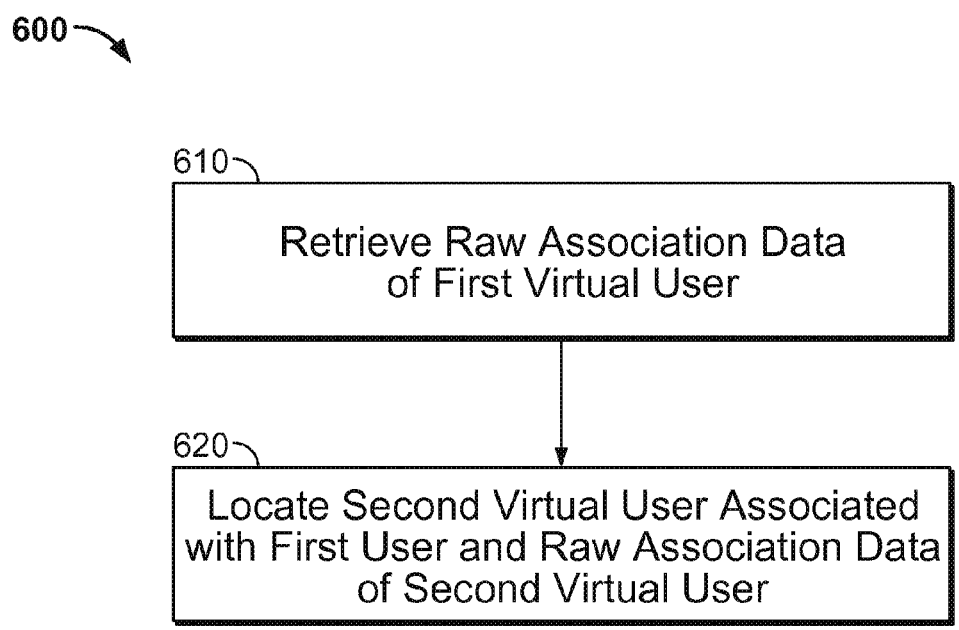
FIG. 6A is a flow chart illustrating an embodiment of a raw association data retrieval method.

In summary, when analyzing two virtual users, an analysis can be performed using the data of a plurality of association dimensions (e.g., an IP address, a cookie, a device fingerprint, a mobile phone number, a telephone number, a fax number, an email address, an address, a user name etc.) simultaneously. The analysis of the data of the association dimensions permits the use of information from other dimensions to detect a real association between two users when the two virtual users do not use the same physical device. Thus, limitations of traditional methods of analysis can be avoided, and an accurate detection of real associations between virtual users of networks can occur. In addition, with the use of such an analysis method, accurately identifying other users having high degrees of association with malicious users, who may also be malicious users, is possible increasing network risk control, and reducing the likelihood of network fraud. FIG. 6A is a flow chart illustrating an embodiment of a raw association data retrieval method. Based on the embodiment in FIG. 5, operation 510 can be implemented using the operations in FIG. 6. The method 600 comprises:

In 610, the server is configured to retrieve raw association data of the first virtual user. For example, assume that the first virtual user is user A, and the raw association data related to user A can include an IP address and a cookie. An example of an IP address can be 10.19.218.208, and an example of a cookie can be 121.0.29.196.69552022087219.5.

In 620, based on the raw association data of the first virtual user, the server is configured to locate the second virtual user associated with the first virtual user, and raw association data of the second virtual user.

For example, using an IP address association dimension, in order to find IP addresses jointly used by user A and all other users, the time factor is discarded, and the data storage format is as depicted in, for example, Tables 1 and 2 below:

TABLE 1

| User | IP address list |
|---|---|
| A | IP1, IP2, IP3 |
| B | IP2 |
| C | IP4 |

TABLE 2

| IP address value | User list |
|---|---|
| IP1 | A |
| IP2 | B, C |
| IP3 | A, C |
| IP4 | C |

The above storage format of key-values enables quickly locating all other virtual users who have used the same IP address as virtual user A. Therefore, locating the users associated with virtual user A is simplified.

Figure 6B:
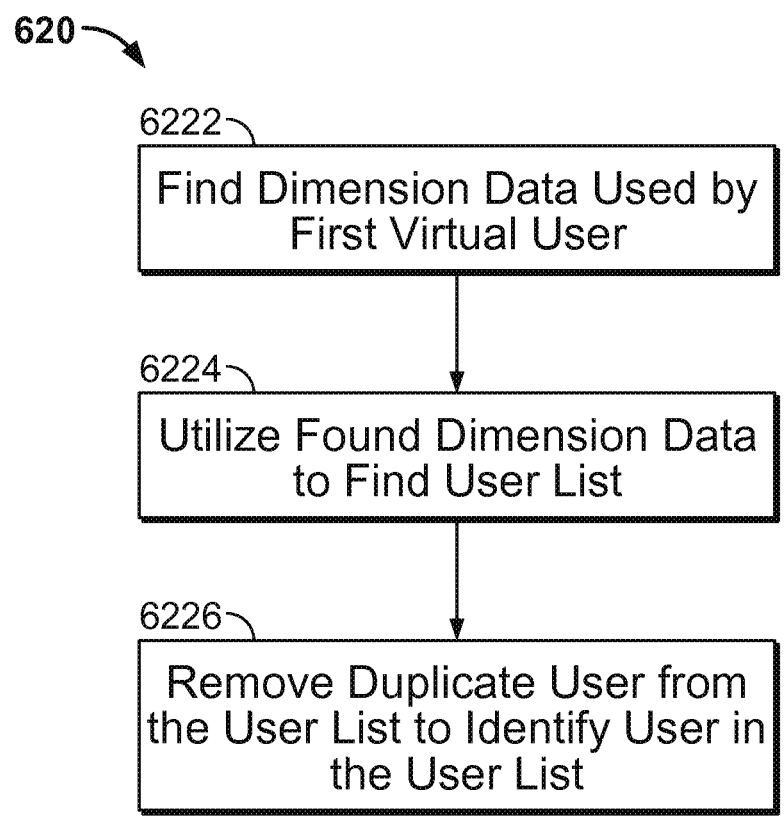
FIG. 6B is a flow chart illustrating an embodiment of locating a second virtual user.

FIG. 6B is a flow chart illustrating an embodiment of locating a second virtual user. The locating operation 620 comprises:

In 6222, for each association dimension, the server is configured to find the dimension data used by the first virtual user based on an identifier of the user.

Furthermore, to determine a degree of real association, Table 1 above can be queried for user A, the query results corresponding to an IP address list relating to user A can be obtained. The query results can be stored in, for example, Table 3 below:

TABLE 3

| User | IP address list |
| --- | --- |
| A | IP1, IP2, IP3 |

As can be seen in Table 3, the IP addresses that user A has used are IP1, IP2, and IP3.

In 6224, the server is configured to utilize the found dimension data to find a user list relating to the found dimension data.

Furthermore, based on a query of Table 2 using the IP addresses IP1, IP2 and IP3 from Table 3 relating to user A, query results corresponding to a user list based on the IP address list can be stored in Table 4. The query results include the following:

TABLE 4

| IP address value | User list |
| --- | --- |
| IP1 | A |
| IP2 | B, C |
| IP3 | A, C |

In 6226, the server is configured to remove a duplicate user in the found user list for each association dimension, so that all users identified in the user lists obtained are second virtual users associated with the first virtual user.

As Table 4 shows, the user who has used IP address IP1 is user A, the users who have used IP address IP2 are users B and C, and the users who have used IP address IP3 are users A and C. After the removal of duplicate users, the user list obtained includes users A, B, and C.

Accordingly, the level one association includes users A, B, and C. After user A is removed, users B and C remain. In other words, the users having a level one association with user A include users B and C.

To determine users having a level two association with user A, Table 1 is queried using users B and C to obtain a list of IP addresses as query results. The query results can be stored in Table 5, as follows:

TABLE 5

| B | IP2 |
| --- | --- |
| C | IP4 |

Table 2 is queried using the list of IP addresses used by users B and C to obtain a user list as query results. The query results can be stored in Table 6, as follows:

TABLE 6

| IP2 | B, C |
| --- | --- |
| IP4 | C |

After the removal of duplicate users, the level two association include users B and C.

Similarly, as an example, the above-described data storage format can be employed for other raw association data, such as an IP address, a cookie, a device fingerprint, a mobile phone number, a telephone number, a fax number, an email address, an address, a user name, etc.

In summary, as can be seen from FIG. 6, in order to reduce computation volume, a first virtual user can be determined first, followed by the locating of other users associated with the first virtual user. After locating the other users and the first virtual user, a computation of the degree of real association between the other users and the first virtual user can be performed. Based on actual application targets, two users can be grouped and the degree of association between the two users can be computed. As an aspect, a group of two users having a degree of association of 0 can exist.

After user A and associated users B and C have been found, an example of how the degree of real association between user A and an associated user can be computed is provided below.

Based on the IP address association dimension, in the event that users A and B have both used the same IP address, for example, IP1, the likelihood is very high that users A and B are "associated." A quantity factor, a time factor and a cascade factor can be related to the association.

Regarding the quantity factor, in the event that users A and B have both used the same group of IP addresses (for example, IP1, IP2, IP3, . . . ), the likelihood that users A and B are "associated" is very high.

Regarding the time factor, in the event that users A and B have both used the same IP address (for example, IP1), and have both used the same IP address within the past year, the likelihood that users A and B are "associated" is very high. On the other hand, in the event that user A used IP1 during the past year, and user B used IP1 last month, the likelihood that users A and B are "associated" is lower than the event that users A and B have used the same IP address during the same time period.

Regarding the cascade factor, in the event that users A and B have used the same IP address (for example, IP1), and users B and C have used the same IP address (for example, IP2), but the same IP address that users B and C have used is different from the same IP address that users A and B have used. The likelihood that users A and C are "associated" is very high. Based on the above IP address relationships, users A and B are defined to have a level one association, and users A and C are defined to have a level two association.

In other words, because "time" and "cascade level" have a decay effect on "association," a decay function can be used to compute the "time" and the "cascade level," and also because "quantity" has a cumulative effect on "association," a cumulative function can be used to compute the "quantity." The present application is not limited to a specific decay function or cumulative function.

As an example, the cumulative function used for "quantity" can be a summation function, and the decay function used for "time" and "cascade level" can be an inverse function.

Furthermore, time (t) can be classified according to units of months.

For example, t=1 represents the current month, t=2 can represent the previous month, etc., and the degree of association function can be defined as $1/t$.

For cascade level (level), level=1 can represent a level one association via IP address, level=2 can represent a level two association via IP address, . . . , and the degree of association function can be defined as $1/\text{level}$.

As another example, if the time interval corresponds to t, and the cascade level corresponds to level, the degree of association can correspond to $(1/t)*(1/\text{level})$.

In the event that users A and B have a level one association via IP address (for example, users A and B have used the same IP address IP1) in the current month (t=1), the degree of association corresponds to $(1/1)*(1/1)=1$.

In the event that users A and B have a level one association (level=1) via IP address (level=1) in the previous month (t=2), the degree of association corresponds to $(1/2)*(1/1)=0.5$.

In the event that users A and B have a level two association (level=2) in the previous month (t=2), the degree of association corresponds to $(1/2)*(1/2)=0.25$.

To summarize, assuming that time t is limited to six months and the number of cascade levels is 3, with respect to an IP address IP1, the degree of association of two users, for example, users A and B can be as follows:

$$\Sigma_{level(level=1-3)}\Sigma_{t(t=1-6)}(1/t)*(1/level).$$

The summation function can be used as the cumulative function to gather the quantities. In other words, the degrees of association for each IP address can be summed. Assuming that time is limited to six months, and the number of cascade levels is 3, for all IP addresses, the degree of association of users A and B can be as follows:

$$\Sigma_{ip}\Sigma_{level(level=1-3)}\Sigma_{t(t=1-6)}(1/t)*(1/level).$$

Figure 7:
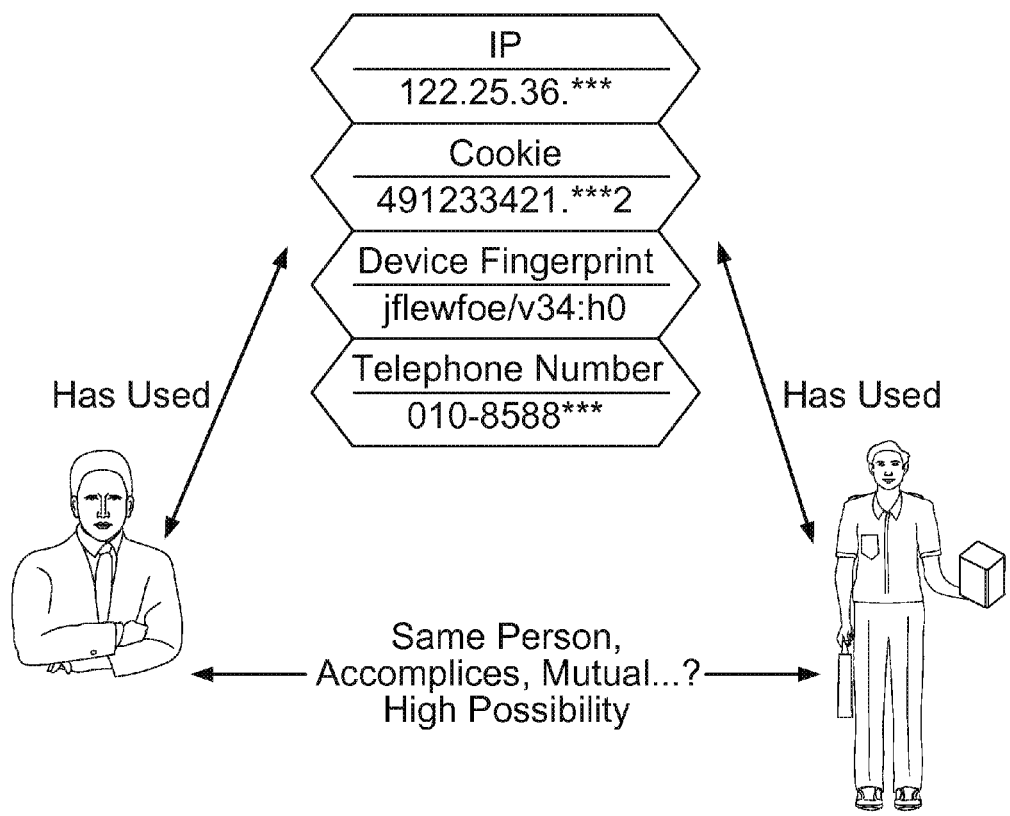
FIG. 7 is a schematic diagram illustrating an embodiment of a multidimensional association among users.

In the above example, the IP address only relates to one dimension (IP addresses). In some embodiments, dimensions in addition to IP addresses can be considered in determining the degree of association such as, for example, cookies, device fingerprints, mobile phone numbers, telephone numbers, fax numbers, email addresses, addresses, user names, etc., as shown in FIG. 7. FIG. 7 is a schematic diagram illustrating an embodiment of a multidimensional association among users.

Figure 8:
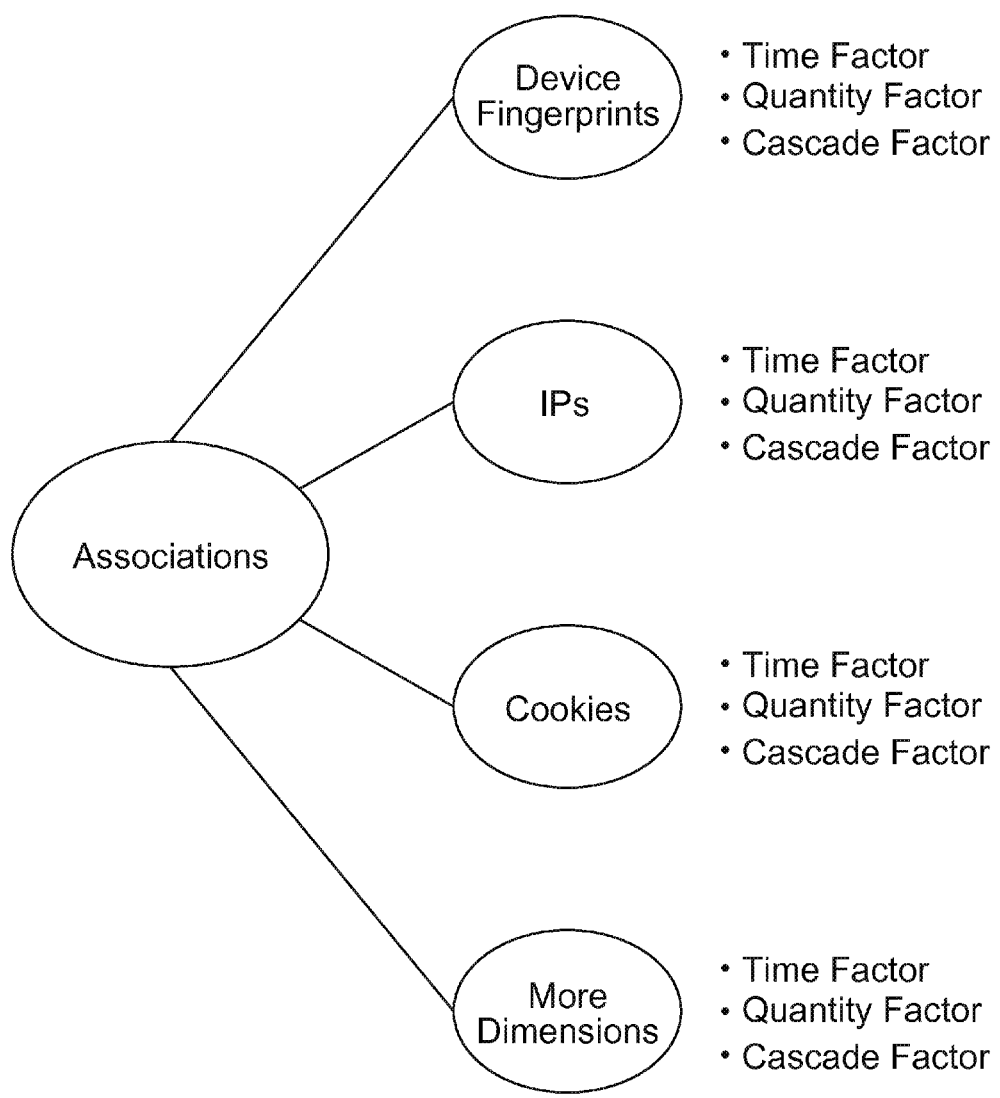
FIG. 8 is a schematic diagram illustrating an embodiment of a computation of degree of association.

For other dimensions, a computation can be perform similar to the computations performed for the IP address association, as shown in FIG. 8. FIG. 8 is a schematic diagram illustrating an embodiment of a computation of degree of association. The computation performed for each association dimension can include the time factor, the quantity factor and the cascade factor. After results are computed for each dimension, the results can be gathered (e.g., summed). Subsequently, the degree of association between virtual users can be determined.

For example, for the associations between users A and B via IP addresses, cookies, device fingerprints and telephone numbers, the computation of each dimension can take into consideration the time factor, quantity factor, and the cascade factor. An IP address association value, a cookie association value, a device fingerprint association value, and a telephone number association value can be separately computed. Subsequently, the association values are gathered by summation to obtain a final degree of real association between users A and B.

In another example, users A and B can be associated based on IP addresses, and users B and C can be associated based on cookies. In the event that users B and C have the same cookie, users B and C are associated. During a final gathering stage, the IP address association value between users A and B and the cookie association value between B and C can be added together or summed to obtain the degree of real association between users A and C.

Additionally, the cumulative function for "quantity" can be the summation function, a weighted sum function, a sum of squares function, or another summation function. The above functions can be generally referred to as summation functions. Similarly, the decay function for "time" and "cascade level" can include the above inverse function, a weighted inverse function, a square inverse function, or another decay function, all of which can be generally referred to as inverse functions.

An example of a weighted inverse function is as follows:

Sum=$x1+x2+x3$;

Weighted sum=$a*x1+b*x2+c*x3$;

Inverse=$1/x1+1/x2+1/x3$;

Weighted inverse=$a/x1+b/x2+c/x3$;

Note: a, b, and c are all weighting coefficients.

Examples of the sum of squares and the square inverse are as follows:

Sum=$x1+x2+x3$;

Sum of squares=$x1^2+x2^2+x3^2$;

Inverse=$1/x1+1/x2+1/x3$;

Square inverse=$1/(x1^2)+1/(x2^2)+1/(x3^2)$;

Note: $x1^2=x1*x1$.

To summarize, the expansion of association dimensions and analytical factors under the same dimension permits utilization of information from other dimensions to detect the real associations between users even if the virtual users do not use the same physical device. Thus, the limitations of traditional methods of analysis can be avoided to enable a more accurate determination of the real associations of virtual users on a network. Moreover, relative to conventional single-factor analyses, the expansion of association dimensions and analytical factors under the same dimension increases accuracy of the analytical results.

The above analysis of the real associations of network virtual users can be applied in a variety of scenarios. For example, in a network risk control scenario, in the event that a certain user is known to have committed acts of fraud and is unreliable, a risk of similar fraud by other users having a real association with the certain user also exists. Another example is in an intelligent recommendation scenario. In the event that a certain user is known as liking to buy articles for outdoor use, articles for outdoor use can be recommended automatically to other users having a real association with this user. The recommendations can be used to increase purchase levels.

Based on the above descriptions of the above methods, a corresponding system is provided.

Figure 9:
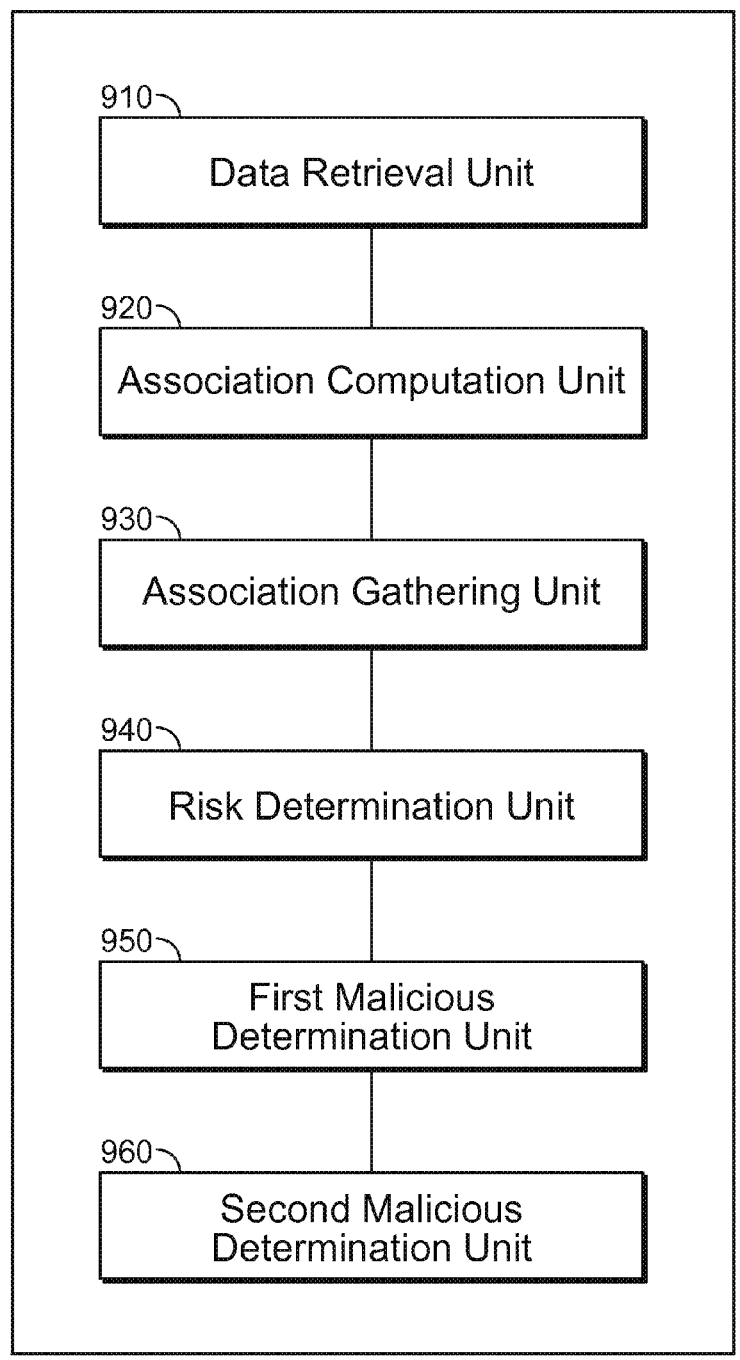
FIG. 9 is a structural diagram illustrating an embodiment of a network virtual user risk control system.

FIG. 9 is a structural diagram illustrating an embodiment of a network virtual user risk control system. The system 900 comprises a data retrieval unit 910, an association computation unit 920, an association gathering unit 930, a risk determination unit 940, a first malicious determination unit 950 and a second malicious determination unit 960.

The data retrieval unit 910 is configured to separately retrieve raw association data of a first virtual user and raw association data of a second virtual user. The raw association data includes multidimensional data. The data of each dimension is capable of identifying a user and serving as an association dimension.

The association computation unit 920 is configured to, based on the raw association data of the first and second virtual users, separately compute at least one association value between the first virtual user and the second virtual user for an association dimension. In some embodiments, the association computation module 920 is configured to, based on the raw association data of the first and second virtual users, separately compute the at least one association value between the first virtual user and the second virtual user for each association dimension.

The association gathering unit 930 is configured to gather the at least one association value of the association dimension to obtain a degree of real association between the first virtual user and the second virtual user.

The risk determination unit 940 is configured to determine whether the degree of real association between the first virtual user and the second virtual user exceeds a predetermined threshold value.

The first malicious determination unit 950 is configured to in the event that the degree of real association between the first virtual user and the second virtual user exceeds the predetermined threshold value, determine whether one of the first and second virtual users is a malicious user.

The second malicious determination unit 960 is configured to in the event that one of the first and second virtual users is a malicious user, determine that the other of the first and second virtual users is a malicious user.

In some embodiments, the association computation unit 920 is configured to compute the at least one association value between the first virtual user and the second virtual user for each association dimension. In some embodiments, the association computation unit 920 is configured to compute at least two association values between the first virtual user and the second virtual user for each association dimension. The at least one association value or the at least two association values can be computed based on a quantity factor, a time factor and a cascade factor.

In some embodiments, the quantity factor can employ a summation function.

In some embodiments, the time factor and the cascade factor can both employ inverse functions.

In some embodiments, the association computation unit 920 can compute the association values between the first virtual user and the second virtual user using the following formula:

$$\Sigma_x \Sigma_{level} \Sigma_t (1/t)*(1/\text{level});$$

$\Sigma$ can correspond to the summation function, x can correspond to the association quantity under a certain association dimension, level can correspond to a cascade level, and t can correspond to time.

In some embodiments, the multidimensional data can include: an IP address, a cookie, a device fingerprint, a mobile phone number, a telephone number, a fax number, an email address, an address, a user name, or any combination thereof.

Figure 10A:
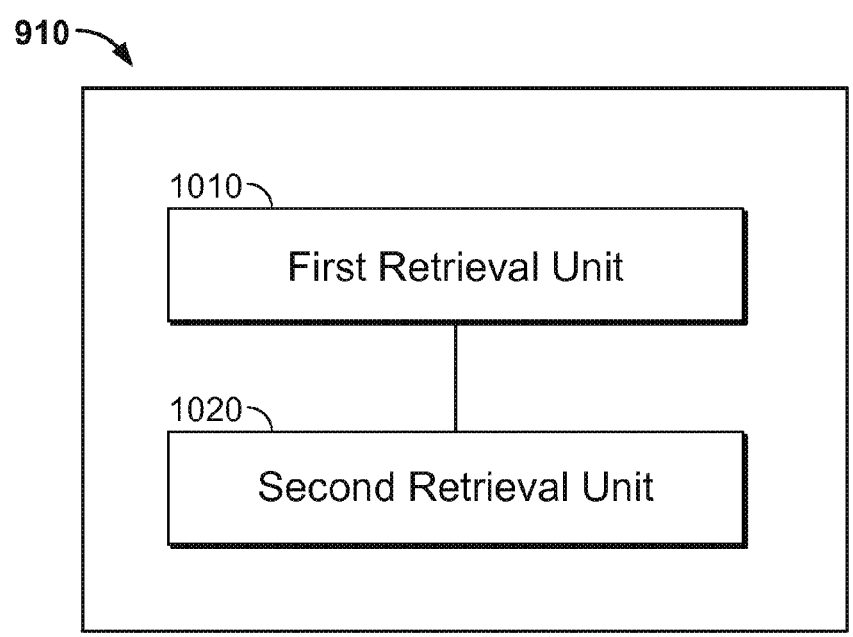
FIG. 10A is a structural diagram illustrating an embodiment of a data retrieval unit.

FIG. 10A is a structural diagram illustrating an embodiment of a data retrieval unit. The data retrieval unit 910 can include a first retrieval unit 1010, a second retrieval unit 1020.

The first retrieval unit 1010 is configured to retrieve the raw association data of the first virtual user.

The second retrieval unit 1020 is configured to based on the raw association data of the first virtual user, locate the second virtual user associated with the first virtual user and the raw association data of the second virtual user.

Figure 10B:
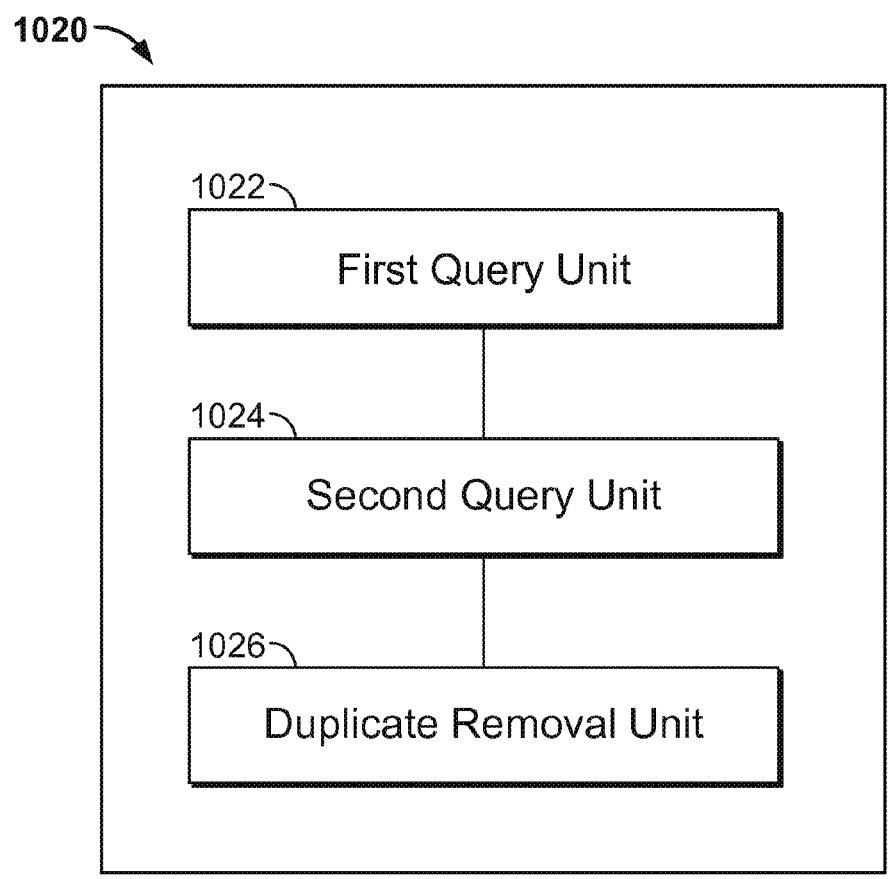
FIG. 10B is a structural diagram illustrating an embodiment of a second retrieval unit.

FIG. 10B is a structural diagram illustrating an embodiment of a second retrieval unit. The second retrieval unit 1020 can include a first query unit 1022, a second query unit 1024, and a duplicate removal unit 1026.

The first query unit 1022 is configured to for each association dimension, find dimension data used by the first virtual user based on an identifier of the first virtual user.

The second query unit 1024 is configured to utilize the found dimension data to find a user list corresponding to the dimension data.

The duplicate removal unit 1026 is configured to remove duplicate users from the user list found for the each association dimension to identify a user in the user list as a second virtual user associated with the first virtual user.

In some embodiments, the association gathering unit 930 can be configured to sum the at least one association value for the association dimension.

In regard to the system embodiments, because they are fundamentally similar to the method embodiments, the descriptions are relatively simple; portions of the explanation of the method embodiments can be referred to for the relevant aspects.

The risk control system described above can accurately detect the real associations between virtual users of the network, and can then accurately identify other users having a high degree of association with malicious users, as malicious users, strengthening network risk control, and decreasing the occurrence of network fraud.

Figure 11:
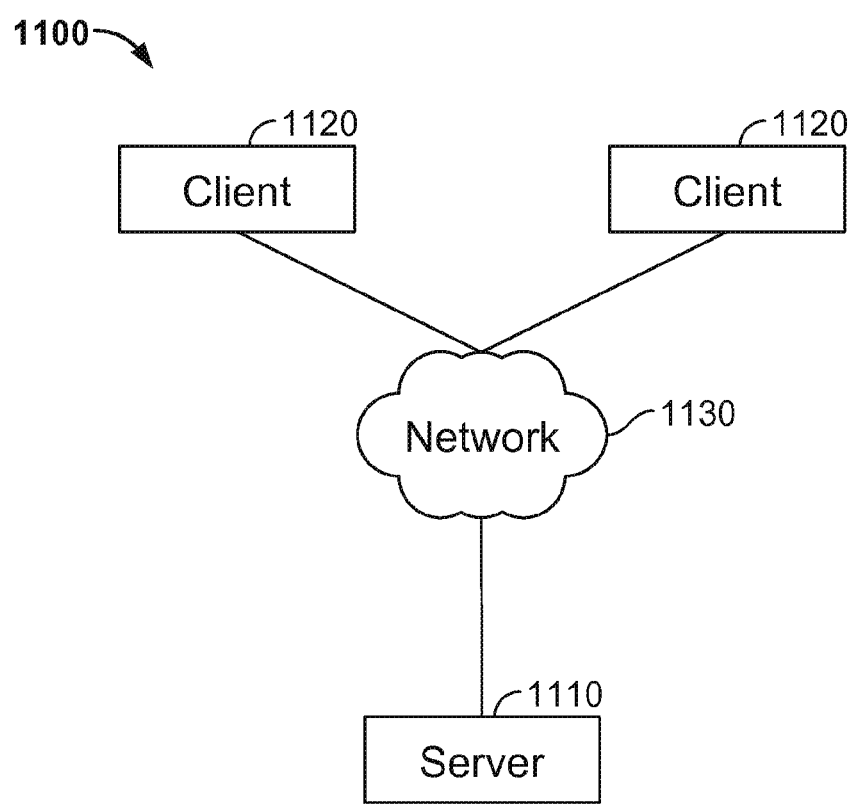
FIG. 11 is a diagram of an embodiment of a network virtual user risk control system.

FIG. 11 is a diagram of an embodiment of a network virtual user risk control system. The system 1100 comprises a plurality of clients 1120 connected to a server 1110 via a network 1130. The system 900 of FIG. 9 can be used to implement the server 1110. The first and second virtual users can utilize the clients 1120.

The units described above can be implemented as software components executing on one or more general purpose processors, as hardware such as programmable logic devices and/or Application Specific Integrated Circuits designed to perform certain functions or a combination thereof. In some embodiments, the units can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The units may be implemented on a single device or distributed across multiple devices. The functions of the units may be merged into one another or further split into multiple sub-units.

The methods or algorithmic steps described in light of the embodiments disclosed herein can be implemented using hardware, processor-executed software modules, or combinations of both. Software modules can be installed in random-access memory (RAM), memory, read-only memory (ROM), electrically programmable ROM, electrically erasable programmable ROM, registers, hard drives, removable disks, CD-ROM, or any other forms of storage media known in the technical field.

Although the foregoing embodiments have been described in some detail for purposes of clarity of understanding, the invention is not limited to the details provided. There are many alternative ways of implementing the invention. The disclosed embodiments are illustrative and not restrictive.

The invention claimed is:

1. A computer program product for controlling network virtual user risk, the computer program product being embodied in a non-transitory computer readable storage medium and comprising computer instructions for:

computing at least one association value between a first virtual user and a second virtual user for at least one association dimension, wherein the computing of the at least one association value is performed based on raw association data of the first virtual user and the second virtual user; and wherein one of the first virtual user and the second virtual user is deemed to be a malicious user;

obtaining a degree of real association between the first virtual user and the second virtual user based on the at least one association value of the at least one association dimension; and determining whether the other of the first and second virtual users is a malicious user based on the degree of real association;

retrieving the raw association data of the first virtual user; and based on the raw association data of the first virtual user, locating the second virtual user associated with the first user and the raw association data of the second virtual user, wherein the locating of the second virtual user associated with the first virtual user and the raw association data of the second virtual user comprises:

for each association dimension, finding dimension data used by the first virtual user based on an identifier of the first virtual user;

utilizing the found dimension data to find a user list corresponding to the dimension data; and removing a duplicate user from the user list found for the each association dimension to identify a user in the user list as the second virtual user associated with the first virtual user.

2. A network virtual user risk control method, comprising:

computing, using a hardware processor, at least one association value between a first virtual user and a second virtual user for at least one association dimension, wherein the computing of the at least one association value is performed based on raw association data of the first virtual user and the second virtual user; and wherein one of the first virtual user and the second virtual user is deemed to be a malicious user; wherein the computing of the at least one association value between the first virtual user and the second virtual user for the at least one association dimension comprises:

for the at least one association dimension, computing the at least one association value between the first virtual user and the second virtual user based on a quantity factor employing a summation function, the summation function being based on an inverse function comprising a time factor and a cascade factor;

obtaining a degree of real association between the first virtual user and the second virtual user based on the at least one association value of the at least one association dimension; and determining whether the other of the first and second virtual users is a malicious user based on the degree of real association.

3. The method as described in claim 2, wherein the at least one association value between the first virtual user and the second virtual user for the at least one association dimension is computed using the following formula:

$$\Sigma_x \Sigma_{level} \Sigma_t (1/t)*(1/level),$$

wherein $\Sigma$ corresponds to the summation function, x corresponds to the association quantity for an association dimension, level corresponds to a cascade level, and t corresponds to time.

4. The method as described in claim 2, wherein the raw association data comprises an IP address, a cookie, a device fingerprint, a mobile phone number, a telephone number, a fax number, an email address, an address, a user name, or any combination thereof.

5. The method as described in claim 2, wherein the gathering of the at least one association value comprises summing the at least one association value for the each association dimension.

6. A network virtual user risk control method, comprising:

computing, using a hardware processor, at least one association value between a first virtual user and a second virtual user for at least one association dimension, wherein the computing of the at least one association value is performed based on raw association data of the first virtual user and the second virtual user; and wherein one of the first virtual user and the second virtual user is deemed to be a malicious user;

obtaining a degree of real association between the first virtual user and the second virtual user based on the at least one association value of the at least one association dimension; and determining whether the other of the first and second virtual users is a malicious user based on the degree of real association;

retrieving the raw association data of the first virtual user; and based on the raw association data of the first virtual user, locating the second virtual user associated with the first user and the raw association data of the second virtual user, wherein the locating of the second virtual user associated with the first virtual user and the raw association data of the second virtual user comprises:

for each association dimension, finding dimension data used by the first virtual user based on an identifier of the first virtual user;

utilizing the found dimension data to find a user list corresponding to the dimension data; and removing a duplicate user from the user list found for the each association dimension to identify a user in the user list as the second virtual user associated with the first virtual user.

7. A network virtual user risk control system, comprising:

at least one processor configured to:

compute at least one association value between a first virtual user and a second virtual user for at least one association dimension, wherein the computing of the at least one association value is performed based on raw association data of the first virtual user and the second virtual user; and wherein one of the first virtual user and the second virtual user is deemed to be a malicious user; wherein the computing of the at least one association value between the first virtual user and the second virtual user for the at least one association dimension comprises to:

for the at least one association dimension, compute the at least one association value between the first virtual user and the second virtual user based on a quantity factor employing a summation function, the summation function being based on an inverse function comprising a time factor and a cascade factor;

obtain a degree of real association between the first virtual user and the second virtual user based on the at least one association value of the at least one association dimension; and determine whether the other of the first and second virtual users is a malicious user based on the degree of real association; and a memory coupled to the at least one processor and configured to provide the at least one processor with instructions.

8. The system as described in claim 7, wherein:
the at least one association value between the first virtual user and the second virtual user is computed using the following formula:

$$\Sigma_x \Sigma_{level} \Sigma_t (1/t)*(1/\text{level}),$$

wherein Σ corresponds to the summation function, x corresponds to the association quantity under an association dimension, level corresponds to a cascade level, and t corresponds to time.

9. The system as described in claim 7, wherein the raw association data comprises an IP address, a cookie, a device fingerprint, a mobile telephone number, a telephone number, a fax number, an email address, an address, a user name, or any combination thereof.

10. The system as described in claim 7, wherein the gathering of the at least one association value comprises summing the at least one association value for the each association dimension.

11. A network virtual user risk control system, comprising:
at least one processor configured to:
compute at least one association value between a first virtual user and a second virtual user for at least one association dimension, wherein the computing of the at least one association value is performed based on raw association data of the first virtual user and the second virtual user; and wherein one of the first virtual user and the second virtual user is deemed to be a malicious user;
obtain a degree of real association between the first virtual user and the second virtual user based on the at least one association value of the at least one association dimension;
determine whether the other of the first and second virtual users is a malicious user based on the degree of real association;
retrieve the raw association data of the first virtual user; and
based on the raw association data of the first virtual user, locate the second virtual user associated with the first user and the raw association data of the second virtual user, wherein the locating of the second virtual user associated with the first virtual user and the raw association data of the second virtual user comprises:
for each association dimension, finding dimension data used by the first virtual user based on an identifier of the first virtual user;
utilizing the found dimension data to find a user list corresponding to the dimension data; and
removing a duplicate user from the user list found for the each association dimension to identify a user in the user list as the second virtual user associated with the first virtual user; and
a memory coupled to the at least one processor and configured to provide the at least one processor with instructions.

12. A computer program product for controlling network virtual user risk, the computer program product being embodied in a non-transitory computer readable storage medium and comprising computer instructions for:
computing at least one association value between a first virtual user and a second virtual user for at least one association dimension, wherein the computing of the at least one association value is performed based on raw association data of the first virtual user and the second virtual user; and wherein one of the first virtual user and the second virtual user is deemed to be a malicious user; wherein the computing of the at least one association value between the first virtual user and the second virtual user for the at least one association dimension comprises:
for the at least one association dimension, computing the at least one association value between the first virtual user and the second virtual user based on a quantity factor employing a summation function, the summation function being based on an inverse function comprising a time factor and a cascade factor;
obtaining a degree of real association between the first virtual user and the second virtual user based on the at least one association value of the at least one association dimension; and determining whether the other of the first and second virtual users is a malicious user based on the degree of real association.

* * * * *